(12) United States Patent
Nash

(10) Patent No.: US 9,388,478 B1
(45) Date of Patent: Jul. 12, 2016

(54) TECHNETIUM RECOVERY FROM HIGH ALKALINE SOLUTION

(71) Applicant: Savannah River Nuclear Solutions, LLC, Aiken, SC (US)

(72) Inventor: Charles A. Nash, North Augusta, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 67 days.

(21) Appl. No.: 14/576,362

(22) Filed: Dec. 19, 2014

(51) Int. Cl.
*C22B 61/00* (2006.01)
*B01D 15/00* (2006.01)
*C01G 99/00* (2010.01)

(52) U.S. Cl.
CPC ............... *C22B 61/00* (2013.01); *B01D 15/00* (2013.01); *C01G 99/00* (2013.01)

(58) Field of Classification Search
None
See application file for complete search history.

(56) References Cited

U.S. PATENT DOCUMENTS

| | | |
|---|---|---|
| 3,005,683 A | 10/1961 | Rimshaw |
| 3,890,244 A | 6/1975 | Carlin |
| 3,891,741 A | 6/1975 | Carlin et al. |
| 4,156,646 A | 5/1979 | Schulz |
| 4,432,893 A | 2/1984 | Lee et al. |
| 4,469,628 A | 9/1984 | Simmons et al. |
| 4,654,173 A | 3/1987 | Walker et al. |
| 5,156,722 A | 10/1992 | Snyder et al. |
| 5,443,731 A | 8/1995 | Moyer et al. |
| 5,766,478 A | 6/1998 | Smith et al. |
| 5,888,397 A | 3/1999 | Rogers et al. |
| 5,894,077 A | 4/1999 | Jones et al. |
| 6,150,155 A | 11/2000 | Wildung et al. |
| 6,183,722 B1 | 2/2001 | Dean et al. |
| 2002/0006867 A1 | 1/2002 | Ponder et al. |
| 2014/0058183 A1 | 2/2014 | Hagerty |

FOREIGN PATENT DOCUMENTS

| | | |
|---|---|---|
| EP | 0 726 329 A1 | 8/1996 |
| WO | WO 99 / 63549 | 12/1999 |
| WO | WO 00 / 03398 | 1/2000 |
| WO | WO 01 / 65570 | 9/2001 |
| WO | WO 2012 / 170086 | 12/2012 |
| WO | 2014/097269 | * 6/2014 |

* cited by examiner

*Primary Examiner* — Steven Bos
(74) *Attorney, Agent, or Firm* — Dority & Manning, P.A.

(57) ABSTRACT

Disclosed are methods for recovering technetium from a highly alkaline solution. The highly alkaline solution can be a liquid waste solution from a nuclear waste processing system. Methods can include combining the solution with a reductant capable of reducing technetium at the high pH of the solution and adding to or forming in the solution an adsorbent capable of adsorbing the precipitated technetium at the high pH of the solution.

24 Claims, 1 Drawing Sheet

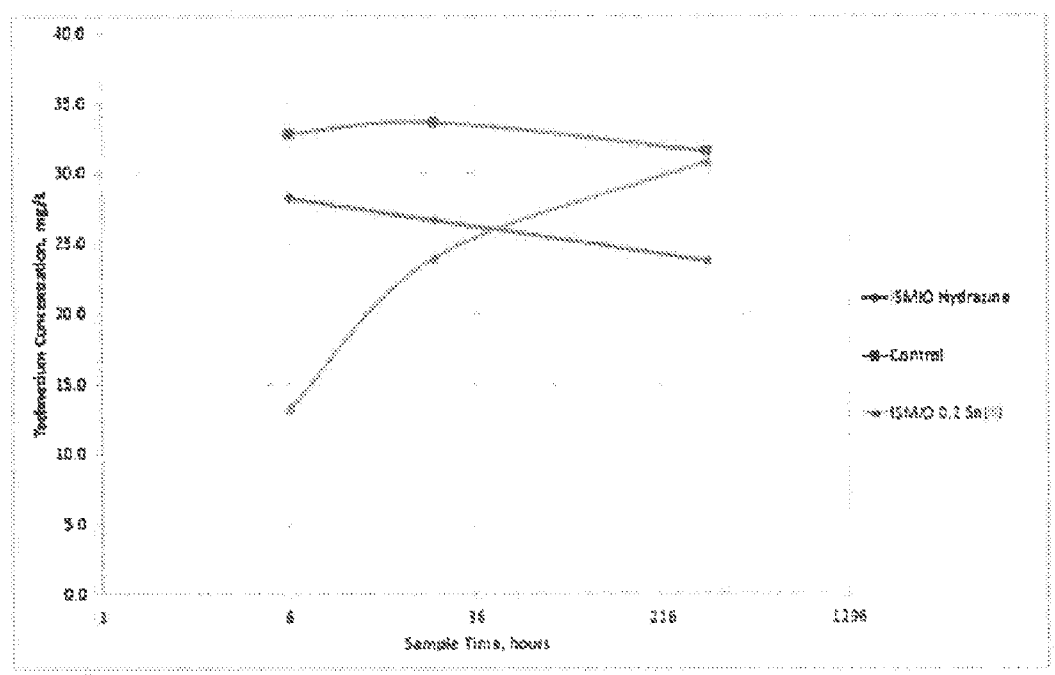

US 9,388,478 B1

TECHNETIUM RECOVERY FROM HIGH ALKALINE SOLUTION

STATEMENT AS TO RIGHTS, TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

Reprocessing of spent nuclear fuel can be used to recover plutonium, uranium, and other materials. The current standard method for fuel reprocessing is the PUREX method, which is a liquid-liquid extraction method that can extract both uranium and plutonium independently of each other as well as from other fission products. The liquid-liquid extraction process generates high volumes of liquid waste that carries many of the fission products and transuranic elements generated in the core as well as actinides and a plurality of different salts. The raffinate from the PUREX method is treated to separate a portion of the waste, which is then precipitated and vitrified. The resulting glass is retained in long-term storage containers. The remaining large volume of liquid waste is further treated to remove actinides and fission products to the greatest extent possible.

The liquid waste treatment processes are generally designed to remove cationic species like cesium (e.g., cesium-137) and strontium (e.g., strontium-90). Unfortunately, certain fission products that form anionic species, such as technetium in the form of pertechnetate, are not removed from the liquid waste by these treatment processes. As such, these anionic fission products often remain in the post-treatment salt solution. This salt solution exhibits low activity levels and must be properly treated and stored to prevent release of remaining contaminants. In addition, the waste acceptance criteria for this solution changes with time, and it is expected that future requirements will call for the more complete removal of contaminants such as technetium from the large volume salt solution.

All of the isotopes of technetium are radioactive, and many of them, particularly those produced as a result of fission reactions, have long half-lives, which raise major concerns for long-term storage. Current treatment of the remaining salt solution includes mixing it with a blend of cementitious materials to form a grout mixture. Upon curing of the grout mixture through hydration reactions, a hardened monolithic cementitious waste form known as saltstone is formed. Saltstone is designed to be stored at long-term storage sites. This particular treatment process is carried out at the Savannah River Site nuclear reservation in South Carolina, USA.

While this treatment method has proven highly effective for some contaminants, saltstone is unlikely to hold technetium successfully for long term storage as Tc-99 has a half-life of 211,000 years. Over time, the technetium in the saltstone can be oxidized to a more soluble state. If the waste then comes into contact with water, the soluble components can leach into the environment, particularly those soluble components such as oxidized technetium compounds that do not adsorb well onto the surfaces of minerals, making them more likely to escape into the environment.

What are needed in the art are less expensive, straightforward separation methods that can be utilized to recover technetium from highly alkaline solutions.

SUMMARY

Aspects and advantages of the invention will be set forth in part in the following description, or may be obvious from the description, or may be learned through practice of the invention.

In one embodiment, disclosed is a method for recovering technetium from a high alkaline solution. The method can include combining the alkaline solution that contains dissolved technetium with a reductant that is capable of reducing the technetium to an insoluble state in the highly alkaline (e.g. pH 14 or higher) liquid. The method also includes adding to the solution or alternatively forming in the solution an adsorbent that is capable of adsorbing the precipitated technetium at the conditions of the highly alkaline solution.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended FIGURE, in which:

FIG. 1 compares the change in technetium concentration with time for a high alkaline solution upon treatment with different adsorbent/reductant compositions.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to methods for recovering technetium from a highly alkaline solution. In one embodiment, the highly alkaline solution can be a liquid waste solution from a nuclear waste processing system, but this is not a requirement of the method, and other highly alkaline liquid solutions can be treated as described to recover dissolved technetium. For instance, disclosed methods can be utilized in facilities dedicated to the production of technetium-99m, which has multiple uses in medical applications. These facilities generally produce technetium by irradiating dedicated highly enriched uranium targets in a reactor, extracting molybdenum-99 from the targets in reprocessing facilities, and recovering technetium-99m upon decay of the molybdenum-99.

The molybdenum-99 in the form of molybdate is adsorbed onto acid alumina ($Al_2O_3$) in a shielded column chromatograph inside a technetium-99m generator. Molybdenum-99 has a half-life of 67 hours, so short-lived technetium-99m (half-life: 6 hours), which results from its decay, is being constantly produced. The soluble pertechnetate $TcO^{-4}$ thus formed can be quickly and efficiently recovered according to disclosed methods.

According to the disclosed methods, the solution to be treated can be highly alkaline. For instance, the solution can be at pH 12 or greater, pH 13 or greater, or pH 14 or greater in one embodiment. To recover the dissolved technetium, a reductant that is capable of reducing technetium in the highly alkaline environment to a non-soluble oxidation state and an adsorbent that is capable of adsorbing the thus precipitated technetium in the highly alkaline environment are combined with the liquid. Without wishing to be bound to any particular theory, it is believed that the reductants and adsorbents can work particularly well in conjunction with one another such that technetium can be removed from the liquid in high quantities. For instance, the batch distribution coefficient for the system can be about 400 mL/g or greater, about 500 mL/g or greater, about 1000 mL/g or greater, about 1300 mL/g or greater, about 2000 mL/g or greater, or about 5000 mL/g or greater in some embodiments. As utilized herein, the term batch distribution coefficient generally refers to the ratio of the amount of adsorbate (e.g., technetium) adsorbed per unit mass of the solid to the equilibrium adsorbate concentration in solution.

The disclosed methods can also remove the technetium with a high decontamination factor. For instance, the decontamination factor of the method with regard to the technetium can be about 2.2 or greater, about 2.5 or greater, about 3 or greater, about 4 or greater, about 6 or greater, about 7 or greater, or about 10 or greater in some embodiments. As utilized herein, the term decontamination factor generally refers to the ratio of radioactivity prior to and following the removal of technetium from the liquid.

Beneficially, the process can be carried out without altering the alkaline characteristic of the starting solution. As such, following the removal of the technetium, the remaining solution can safely be stored until final disposal without concern of storage tank corrosion.

The precipitation and recovery process for the technetium can be carried out at low temperatures. For instance, the processing temperature can be ambient in one embodiment, and in general about 40° C. or less, for instance between about 20° C. and about 35° C. In addition, the process can be carried out in atmospheric conditions—i.e., there is no necessity for an inert atmosphere such as use of a nitrogen blanket, etc. Though this is not a requirement of the method, and an inert atmosphere can be utilized if desired.

Several reductants have been discovered that can be successfully utilized to precipitate technetium at these conditions and in conjunction with the adsorbents described herein. In addition, the reductants can be utilized alone or in combination with one another. One suitable reductant is the stannous ion (Sn(II)).

The stannous reductant can be added to the liquid as a salt of the stannous ion, for instance as stannous chloride ($SnCl_2$). This is not a requirement however, and the stannous ion can be provided to the solution in any suitable form.

Another suitable reductant is hydrazine ion, which, like the stannous ion, can be added to the liquid in a suitable salt formation, such as hydrazine sulfate in one embodiment. This is not a requirement however, and the hydrazine on can be provided to the solution in any suitable form.

Dithionite ion can also be utilized as the reductant in some embodiments. For instance, dithionite ion in the form of the dithionite salt (e.g., sodium dithionite, $Na_2S_2O_4$) can be utilized. Though, again, the form in which the dithionite ion is provided to the solution is not particularly limited.

The reductant can be added to the highly alkaline liquid at a relatively low concentration, generally about 1 M or less, about 0.5 M or less, about 0.1 M or less, or about 0.05 M or less. For instance, the reductant can be added to the highly alkaline liquid at a concentration of from about 0.01 M to about 0.05 M, or about 0.02 M in one embodiment.

The method also utilizes an adsorbent or a combination of adsorbents capable of use at the highly alkaline conditions of the liquid. One suitable adsorbent that can be utilized is a freshly precipitated iron hydroxide. Significantly, when utilized as adsorbent, the iron hydroxide can be freshly precipitated rather than provided as a pre-formed solid. For instance, an iron salt, e.g., iron (II) sulfate ($FeSO_4$) in an acidic solution can be added to the highly alkaline solution upon which the iron hydroxide can precipitate in the solution as the adsorbent. Previously known iron-based solid adsorbents commonly utilized at lower pH values, such as iron powders, goethite, and magnetite, will not work effectively at the high alkaline conditions of the disclosed processes.

Zirconium dioxide powder ($ZrO_2$) can also be utilized as an effective adsorbing agent, as can sodium molybdate ($Na_2MoO_4$) and ferrous oxalate ($FeC_2O_4$). Ferrous oxalate can be particularly effective as adsorbent when utilized in conjunction with a stannous ion reductant and/or a dithionite ion reductant, but is also useful in conjunction with the hydrazine ion reductant. Beneficially, most storage tank supernatant solutions from nuclear waste processing include some oxalate ion, which can facilitate formation of the ferrous oxalate adsorbent merely through the addition of ferrous reagent solutions to the storage tank supernatant.

The concentration of the adsorbent added to or formed in the solution can vary depending upon the particular components involved, and variation and optimization is well within the capabilities of one of ordinary skill in the art. In general, however, the adsorbent can be added or formed in the solution in an amount of about 0.25 mg/mL solution or greater, for instance about 0.3 mg/mL solution or greater, or from about 0.3 rig/mL solution to about 3 mg/mL solution in some embodiments. When considering the iron-containing adsorbents such as the iron oxalate and the freshly precipitated iron hydroxide, the iron of the adsorbent can be added to the solution in a concentration of about 0.1 grams iron per liter solution or greater, for instance from about 0.1 grams iron per liter solution to about 0.5 grams iron per liter solution.

In addition to the reductant and the adsorbent that can function in the highly alkaline environment, the method can also utilize an enhancing reagent. The enhancing reagent does not function as either a reductant or an adsorbent, but serves to enhance removal of the technetium from the solution by the reductant and the adsorbent. Sulfide ion added to the solution at a concentration of about 0.01 M or greater, for instance about 0.02 M has been shown to enhance removal of technetium from the solution. Sulfide ion can be added to the solution in any suitable form, for instance in the form of a sulfide salt, e.g., sodium sulfide.

Depending upon the contents of the starting solution, the disclosed methods may remove contaminants in addition to the technetium. For instance, the disclosed methods can remove soluble uranium and chromium from the solution in certain embodiments.

The present disclosure may be better understood with reference to the examples, set forth below.

Example 1

Saltcake from the Savannah River Site was dissolved and spiked with pertechnetate and removal of technetium was carried out by use of several previously known adsorbents and several systems described as herein.

The solutions were combined with additives as described in the table below. Freshly precipitated iron hydroxide (in situ mixed iron oxide, IS-MIO) was precipitated in the solution following addition of an acid solution of an iron salt in an iron concentration of 0.2 grams per liter or 0.4 grams per liter, as noted. Monosodium titanate (MST) is known as an adsorbent for removal of plutonium, strontium, and other elements from caustic waste solutions. It does not provide technetium or cesium removal as-is.

The comparison adsorbents were added to the solution at an iron concentration of 0.2 grams per liter. The stannous ion reductant was added as stannous chloride at a concentration of 0.01 M and the hydrazine ion reductant was added as hydrazine sulfate at a concentration of 0.1 M.

The batch distribution coefficient was determined for each system and is reported in the table, below. The uncertainty in the coefficient was +/−263 mL/g.

| Time from reagent addition | 6 hours | 24 hours | 2 weeks |
|---|---|---|---|
| Comparison Examples | | | |
| Adsorbent | | | |
| Iron powder | 161 | 82 | −127 |
| Goethite | 43 | 167 | 255 |
| iron sulfide | 63 | −154 | 23 |
| magnetite | 303 | 316 | 451 |
| Representative Examples | | | |
| Reductant/Adsorbent | | | |
| None/IS-MIO (0.2 g/L) | 371 | 130 | 254 |
| None/IS-MIO (0.4 g/L) | 160 | 115 | 115 |
| Hydrazine/IS-MIO (0.2 g/L) | 573 | 826 | 1373 |
| MST/IS-MIO (0.2 g/L) | 333 | 205 | 119 |
| Sn(II)/IS-MIO (0.2 g/L) | 5367 | 1332 | 217 |

The results demonstrates that even at relatively low 0.01 M Sn(II) addition, the system produced a fast but decaying removal. The adsorbent solid was 10 wt. % technetium on a metal only basis at 6 hours, which is a relatively high loading for adsorption. The decay of distribution coefficient was believed to be due to the present of air and depletion of the reductant. In contrast to the IS-MIO/Sn(II) system, the added iron bearing solids goethite and magnetite did not work well. Hydrazine reductant at 0.1 M with IS-MIO removed technetium steadily over two weeks.

The results indicate that the combination of the Sn(II) reductant with the freshly precipitated iron hydroxide (IS-MIO) provides a symbiotic combination.

The solutions were also examined over time for removal of elements in addition to the technetium removal for the system utilizing IS-MIO as adsorbent and Sn(II) as reductant for the 6 hours and 24 hour values. The long term value at 336 was determined for the IS-MIO/hydrazine system. Results are shown in the table below. Results were determined by inductively coupled plasma emission spectrometry and concentrations are reported as mg/L.

| Element | Feed (control) | 6 hours | 24 hours | 336 hours |
|---|---|---|---|---|
| Aluminum | 8880 | 8460 | 8760 | 8380 |
| Boron | 7.67 | 8.48 | 8.63 | 8.14 |
| Chromium | 41.2 | 19.9 | 13.2 | 3.09 |
| Sodium | 152000 | 136000 | 141000 | 136000 |
| Sulfur | 4350 | 4660 | 5030 | 8260 |
| Technetium | 32.6 | 13.2 | 23.9 | 23.7 |
| Tin | <11.8 | 1280 | 1340 | <14.8 |
| Zinc | 1.36 | 1.34 | 1.18 | 1.8 |

This table demonstrates that the Sn(II)/IS-MIO removed the technetium quickly (substantial removal by 6 hours), the technetium was released again over time. The results also demonstrated 30% of the soluble uranium was removed, though other samples showed no uranium removal. In addition, the hydrazine reductant demonstrated good chromium removal.

FIG. 1 shows the time-dependent results for the IS-MIO/Sn(II) and IS-MIO/hydrazine examples. It is believed that high reductant concentration would allow retention of the technetium on the solids for longer.

Example 2

Dithionite and Sn(II) ion were examined for use as reductants in conjunction with zirconium dioxide or ferrous oxalate as adsorbent. Ferrous oxalate was provided as ferrous oxalate dihydrate. Addition amounts and decontamination factors are provided in the table below.

| Adsorbent/time | Concentration | Reductant | Concentration | Decontamination Factor |
|---|---|---|---|---|
| $ZrO_2$, 2 hours | 2 mg/30 mL solution | $SnCl_2 \cdot 2H_2O$ | 0.02M | 2.3 |
| $ZrO_2$, 6 hours | 12 mg/30 mL solution | $SnCl_2 \cdot 2H_2O$ | 0.02M | 4.1 |
| Fe(II) Oxalate, 6 hours | 0.2 g/L (iron) | $SnCl_2 \cdot 2H_2O$ | 0.02M | 6.4 |
| Fe(II) Oxalate, 22.5 hours | 0.2 g/L (iron) | $SnCl_2 \cdot 2H_2O$ | 0.02M | 6.9 |
| Fe(II) Oxalate, 6 hours | 0.2 g/L (iron) | $Na_2S_2O_4$ | 0.02M | 7.5 |
| Fe(II) Oxalate, 22.5 hours | 0.2 g/L (iron) | $Na_2S_2O_4$ | 0.02M | 2.3 |

Example 3

Samples were run to examine the efficacy of a sulfide ion enhancing agent. Samples run utilized Sn(II) as reductant (0.2 M $SnCl_2.2H_2O$) and sulfide ion at 0.2 M (provided as sodium sulfide). Results are shown in the table below,

| Adsorbent | Concentration | Decontamination Factor (2 hr) | Decontamination Factor (6 hr) | Decontamination Factor (22.5 hr) |
|---|---|---|---|---|
| IS-MIO | 0.2 g/L (iron) | 10.4 | 18.5 | — |
| IS-MIO | 0.2 g/L (iron) | — | 6.1 | 5.2 |
| $ZrO_2$ | 13 mg/30 mL | 3.2 | 3.1 | — |
| $Na_2MoO_4$ | 74 mg/30 mL | 4.5 | 4.5 | — |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for recovering technetium from a solution comprising:
   combining the solution with a reductant, the solution having a pH of 12 or greater, the solution comprising dissolved technetium, the reductant being capable at the pH of the solution of reducing the oxidation state of the dissolved technetium to an oxidation state at which the technetium is insoluble in the solution and precipitates out of the solution;
   adding to the solution or forming in the solution an adsorbent, the adsorbent being capable at the pH of the solution of adsorbing the precipitated technetium.

2. The method of claim 1, wherein the solution has a pH of 13 or greater.

3. The method of claim 1, wherein the solution has a pH of 14 or greater.

4. The method of claim 1, wherein the technetium batch distribution coefficient for the method is about 400 mL/g or greater.

5. The method of claim 1, wherein the decontamination factor of the method with regard to technetium is about 2.2 or greater.

6. The method of claim 1, wherein the pH of the solution is not altered during the method.

7. The method of claim 1, wherein the method is carried out at a temperature of about 40° C. or less.

8. The method of claim 1, wherein the method is carried out at ambient temperature.

9. The method of claim 1, wherein the method is carried out at atmospheric conditions.

10. The method of claim 1, wherein the method is carried out in an inert atmosphere.

11. The method of claim 1, wherein the reductant comprises stannous ion.

12. The method of claim 1, wherein the reductant comprises hydrazine ion.

13. The method of claim 1, wherein the reductant comprises dithionite ion.

14. The method of claim 1, wherein the reductant is included in the solution at a concentration of about 1 M or less.

15. The method of claim 1, wherein the adsorbent comprises a compound that is formed in the solution.

16. The method of claim 15, wherein the adsorbent comprises iron hydroxide.

17. The method of claim 1, wherein the adsorbent comprises zirconium dioxide.

18. The method of claim 1, wherein the adsorbent comprises ferrous oxalate.

19. The method of claim 1, wherein the adsorbent comprises molybdate ion.

20. The method of claim 1, wherein the adsorbent is added to or formed in the solution at a concentration of about 0.25 mg/mL of the solution or greater.

21. The method of claim 1, wherein the adsorbent comprises iron, the iron being added to the solution at a concentration of about 0.1 grams per liter of solution or greater.

22. The method of claim 1, the method further comprising combining an enhancing agent to the solution.

23. The method of claim 22, wherein the enhancing agent comprises sulfide ion.

24. The method of claim 1, wherein the solution comprises liquid waste from a nuclear waste processing system.

* * * * *